United States Patent
Fadell et al.

(10) Patent No.: US 10,151,501 B2
(45) Date of Patent: Dec. 11, 2018

(54) THERMOSTAT FACILITATING USER-FRIENDLY INSTALLATION THEREOF

(71) Applicant: Google LLC, Mountain View, CA (US)

(72) Inventors: Anthony Michael Fadell, Portola Valley, CA (US); Yoky Matsuoka, Palo Alto, CA (US); Matthew Lee Rogers, Los Gatos, CA (US); David Sloo, Menlo Park, CA (US); Michael Plitkins, Berkeley, CA (US); Rangoli Sharan, Sunnyvale, CA (US); Joseph Adam Ruff, San Jose, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/595,708

(22) Filed: May 15, 2017

(65) Prior Publication Data
US 2017/0248337 A1    Aug. 31, 2017

Related U.S. Application Data

(63) Continuation of application No. 14/292,642, filed on May 30, 2014, now Pat. No. 9,684,317, which is a
(Continued)

(51) Int. Cl.
*F24F 11/30* (2018.01)
*F24F 11/89* (2018.01)
(Continued)

(52) U.S. Cl.
CPC ...... *F24F 11/0012* (2013.01); *B01D 46/0086* (2013.01); *F24D 19/10* (2013.01);
(Continued)

(58) Field of Classification Search
CPC ............. F24F 2011/0073; G05D 23/19; G05D 23/1902; G05D 23/1917; H01R 9/2416;
(Continued)

(56) References Cited

U.S. PATENT DOCUMENTS

| 4,528,459 A | 7/1985 | Wiegel |
| 4,898,229 A | 2/1990 | Brown et al. |

(Continued)

FOREIGN PATENT DOCUMENTS

| EP | 0447458 | 9/1991 |
| EP | 0510807 | 10/1992 |

(Continued)

OTHER PUBLICATIONS

Aprilaire Electronic Thermostats Model 8355 User's Manual, Research Products Corporation, Dec. 2000, 16 pages.
(Continued)

*Primary Examiner* — Marc Norman
(74) *Attorney, Agent, or Firm* — Kilpatrick Townsend & Stockton LLP

(57) ABSTRACT

A thermostat includes a control unit, a plurality of connection ports, and a user interface operatively coupled to the control unit an having an electronic display. The control unit may be configured and programmed to operate the wire insertion sensing circuits to identify a set of the plurality of connection ports into which corresponding ones of the plurality of HVAC wires have been inserted; cause the electronic display to display a photograph of the plurality of connection ports as they actually appear to a user; and cause the electronic display to visually highlight the set of the plurality of connection ports into which the corresponding ones of the plurality of HVAC wires have been inserted.

20 Claims, 7 Drawing Sheets

Related U.S. Application Data continuation of application No. 13/038,191, filed on Mar. 1, 2011, now Pat. No. 8,757,507.

(60) Provisional application No. 61/429,093, filed on Dec. 31, 2010, provisional application No. 61/415,771, filed on Nov. 19, 2010.

(51) Int. Cl.

| | | |
|---|---|---|
| *G05D 23/19* | (2006.01) | |
| *F24F 11/00* | (2018.01) | |
| *F24D 19/10* | (2006.01) | |
| *B01D 46/00* | (2006.01) | |
| *G05B 15/02* | (2006.01) | |
| *H01R 9/24* | (2006.01) | |
| *G05B 13/02* | (2006.01) | |
| *F24F 11/62* | (2018.01) | |
| *H04W 4/70* | (2018.01) | |
| *F24F 110/00* | (2018.01) | |
| *F24F 110/10* | (2018.01) | |
| *F24F 120/10* | (2018.01) | |
| *F24F 140/60* | (2018.01) | |
| *F24F 11/32* | (2018.01) | |
| *F24F 130/40* | (2018.01) | |
| *F24F 120/20* | (2018.01) | |
| *F24F 11/63* | (2018.01) | |
| *F24F 11/64* | (2018.01) | |
| *F24F 11/56* | (2018.01) | |
| *F24F 11/61* | (2018.01) | |
| *F24F 11/46* | (2018.01) | |
| *F24F 11/52* | (2018.01) | |
| *F24F 11/39* | (2018.01) | |
| *F24F 11/47* | (2018.01) | |

(52) U.S. Cl.
CPC .......... *F24D 19/1084* (2013.01); *F24F 11/30* (2018.01); *F24F 11/62* (2018.01); *F24F 11/89* (2018.01); *G05B 13/0265* (2013.01); *G05B 15/02* (2013.01); *G05D 23/19* (2013.01); *G05D 23/1902* (2013.01); *G05D 23/1917* (2013.01); *H01R 9/2416* (2013.01); *H04W 4/70* (2018.02); *F24F 11/32* (2018.01); *F24F 11/39* (2018.01); *F24F 11/46* (2018.01); *F24F 11/47* (2018.01); *F24F 11/52* (2018.01); *F24F 11/56* (2018.01); *F24F 11/61* (2018.01); *F24F 11/63* (2018.01); *F24F 11/64* (2018.01); *F24F 2110/00* (2018.01); *F24F 2110/10* (2018.01); *F24F 2120/10* (2018.01); *F24F 2120/20* (2018.01); *F24F 2130/40* (2018.01); *F24F 2140/60* (2018.01); *Y02B 10/20* (2013.01); *Y02B 10/70* (2013.01); *Y02D 70/12* (2018.01); *Y02D 70/122* (2018.01); *Y02D 70/142* (2018.01); *Y02D 70/144* (2018.01); *Y02D 70/162* (2018.01); *Y10T 29/49826* (2015.01)

(58) Field of Classification Search
CPC ......... H04W 4/005; H04W 4/70; F24D 19/10; F24D 19/1084
See application file for complete search history.

(56) References Cited

U.S. PATENT DOCUMENTS

| | | |
|---|---|---|
| 4,948,040 A | 8/1990 | Kobayashi et al. |
| 5,065,813 A | 11/1991 | Berkeley et al. |
| 5,107,918 A | 4/1992 | McFarlane et al. |
| 5,161,606 A | 11/1992 | Berkeley et al. |
| 5,181,389 A | 1/1993 | Hanson et al. |
| 5,251,813 A | 10/1993 | Kniepkamp |
| 5,381,950 A | 1/1995 | Aldridge |
| 5,422,808 A | 6/1995 | Catanese, Jr. et al. |
| 5,452,762 A | 9/1995 | Zillner, Jr. |
| 5,456,407 A | 10/1995 | Stalsberg et al. |
| 5,460,327 A | 10/1995 | Hill et al. |
| 5,462,225 A | 10/1995 | Massara et al. |
| 5,467,921 A | 11/1995 | Shreeve et al. |
| 5,481,481 A | 1/1996 | Frey et al. |
| 5,570,837 A | 11/1996 | Brown et al. |
| 5,595,342 A | 1/1997 | McNair et al. |
| 5,611,484 A | 3/1997 | Uhrich |
| 5,635,896 A | 6/1997 | Tinsley et al. |
| 5,646,349 A | 7/1997 | Twigg et al. |
| 5,655,709 A | 8/1997 | Garnett et al. |
| 5,808,294 A | 9/1998 | Neumann |
| 5,918,474 A | 7/1999 | Khanpara et al. |
| 5,950,709 A | 9/1999 | Krueger et al. |
| 6,089,310 A | 7/2000 | Toth et al. |
| 6,102,749 A | 8/2000 | Lynn et al. |
| 6,213,404 B1 | 4/2001 | Dushane et al. |
| 6,315,211 B1 | 11/2001 | Sartain et al. |
| 6,336,593 B1 | 1/2002 | Bhatnagar |
| 6,356,038 B2 | 3/2002 | Bishel |
| 6,513,723 B1 | 2/2003 | Mueller et al. |
| 6,622,925 B2 | 9/2003 | Carner et al. |
| 6,798,341 B1 | 9/2004 | Eckel et al. |
| 6,851,621 B1 | 2/2005 | Wacker et al. |
| 6,851,967 B2 | 2/2005 | Miyoshi et al. |
| 6,956,463 B2 | 10/2005 | Crenella et al. |
| 6,997,390 B2 | 2/2006 | Alles |
| 7,055,759 B2 | 6/2006 | Wacker et al. |
| 7,083,109 B2 | 8/2006 | Pouchak |
| 7,156,318 B1 | 1/2007 | Rosen |
| 7,167,079 B2 | 1/2007 | Smyth et al. |
| 7,174,239 B2 | 2/2007 | Butler et al. |
| 7,181,317 B2 | 2/2007 | Amundson et al. |
| 7,360,370 B2 | 4/2008 | Shah et al. |
| 7,476,988 B2 | 1/2009 | Mulhouse et al. |
| 7,510,126 B2 | 3/2009 | Rossi et al. |
| 7,537,171 B2 | 5/2009 | Mueller et al. |
| 7,562,536 B2 | 7/2009 | Harrod et al. |
| 7,571,865 B2 | 8/2009 | Nicodem et al. |
| 7,634,504 B2 | 12/2009 | Amundson |
| 7,648,077 B2 | 1/2010 | Rossi et al. |
| 7,673,809 B2 | 3/2010 | Juntunen |
| 7,748,640 B2 | 7/2010 | Roher et al. |
| 7,775,452 B2 | 8/2010 | Shah et al. |
| 7,841,542 B1 | 11/2010 | Rosen |
| 7,844,764 B2 | 11/2010 | Williams |
| 7,847,681 B2 | 12/2010 | Singhal et al. |
| 7,849,698 B2 | 12/2010 | Harrod et al. |
| 7,900,849 B2 | 3/2011 | Barton et al. |
| 8,067,912 B2 | 11/2011 | Mullin |
| 8,091,375 B2 | 1/2012 | Crawford |
| 8,757,507 B2 | 6/2014 | Fadell et al. |
| 2003/0037555 A1 | 2/2003 | Street et al. |
| 2003/0090243 A1 | 5/2003 | Atherton |
| 2004/0130454 A1 | 7/2004 | Barton |
| 2004/0193324 A1 | 9/2004 | Hoog et al. |
| 2004/0238651 A1 | 12/2004 | Juntunen et al. |
| 2005/0040250 A1 | 2/2005 | Wruck |
| 2005/0043907 A1 | 2/2005 | Eckel et al. |
| 2005/0145705 A1 | 7/2005 | Shah et al. |
| 2005/0159846 A1 | 7/2005 | Van Ostrand et al. |
| 2005/0270151 A1 | 12/2005 | Winick |
| 2006/0186214 A1 | 8/2006 | Simon et al. |
| 2007/0045432 A1 | 3/2007 | Juntunen |
| 2007/0045441 A1 | 3/2007 | Ashworth et al. |
| 2007/0095082 A1 | 5/2007 | Garrett et al. |
| 2007/0131787 A1 | 6/2007 | Rossi et al. |
| 2007/0157639 A1 | 7/2007 | Harrod |
| 2007/0208461 A1 | 9/2007 | Chase |
| 2007/0221741 A1 | 9/2007 | Wagner et al. |
| 2007/0228183 A1 | 10/2007 | Kennedy et al. |
| 2007/0241203 A1 | 10/2007 | Wagner et al. |
| 2008/0015742 A1 | 1/2008 | Kulyk et al. |
| 2008/0054082 A1 | 3/2008 | Evans et al. |
| 2008/0094010 A1 | 4/2008 | Black |

(56) References Cited

U.S. PATENT DOCUMENTS

| | | | |
|---|---|---|---|
| 2008/0128523 | A1 | 6/2008 | Hoglund et al. |
| 2008/0161977 | A1 | 7/2008 | Takach et al. |
| 2009/0057425 | A1 | 3/2009 | Sullivan et al. |
| 2009/0099697 | A1 | 4/2009 | Li et al. |
| 2009/0140056 | A1 | 6/2009 | Leen |
| 2009/0140057 | A1 | 6/2009 | Leen |
| 2009/0140064 | A1 | 6/2009 | Schultz et al. |
| 2009/0140065 | A1 | 6/2009 | Juntunen et al. |
| 2009/0143879 | A1 | 6/2009 | Amundson et al. |
| 2009/0143880 | A1 | 6/2009 | Amundson et al. |
| 2009/0143918 | A1 | 6/2009 | Amundson et al. |
| 2009/0194601 | A1 | 8/2009 | Flohr |
| 2009/0236433 | A1 | 9/2009 | Mueller et al. |
| 2009/0259713 | A1 | 10/2009 | Blumrich et al. |
| 2010/0006660 | A1 | 1/2010 | Leen et al. |
| 2010/0070099 | A1 | 3/2010 | Watson et al. |
| 2010/0076605 | A1 | 3/2010 | Harrod et al. |
| 2010/0084482 | A1 | 4/2010 | Kennedy et al. |
| 2010/0114382 | A1 | 5/2010 | Ha et al. |
| 2010/0131112 | A1 | 5/2010 | Amundson et al. |
| 2010/0163635 | A1 | 7/2010 | Ye |
| 2010/0182743 | A1 | 7/2010 | Roher |
| 2010/0193592 | A1 | 8/2010 | Simon et al. |
| 2010/0298985 | A1 | 11/2010 | Hess et al. |
| 2011/0253796 | A1 | 10/2011 | Posa et al. |
| 2012/0017611 | A1 | 1/2012 | Coffel et al. |
| 2012/0130679 | A1 | 5/2012 | Fadell et al. |
| 2012/0248211 | A1 | 10/2012 | Warren et al. |

FOREIGN PATENT DOCUMENTS

| | | |
|---|---|---|
| EP | 0660287 | 6/1995 |
| EP | 0690363 | 1/1996 |
| EP | 2302326 | 3/2011 |
| JP | 09298780 | 11/1997 |
| SI | 20556 | 10/2001 |
| WO | 2005019740 | 3/2005 |
| WO | 2007027554 | 3/2007 |
| WO | 2008054938 | 5/2008 |
| WO | 2012068447 A2 | 1/2013 |
| WO | 2012068447 A3 | 1/2013 |

OTHER PUBLICATIONS

Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Thermostat Installation Manual, Jun. 29, 2011, 20 pages.
Ecobee Smart Thermostat User Manual, May 11, 2010, 20 pages.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige THX9321-9421 Operating Manual, Honeywell International, Inc., Jul. 6, 2011, 120 pages.
Honeywell THX9321 Prestige 2.0 and TXH9421 Prestige IAQ 2.0 with EIM Product Data, Honeywell International, Inc., 68-0311, Jan. 2012, 126 pages.
Hunter Internet Thermostat Installation Guide, Hunter Fan Co., Aug. 14, 2012, 8 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
TB-PAC, TB-PHP, Base Series Programmable Thermostats, Carrier Corp., May 14, 2012, 8 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
International Application No. PCT/US2011/061365, International Search Report and Written Opinion dated Oct. 1, 2012, 3 pages.
U.S. Appl. No. 13/038,191, Non-Final Office Action dated Dec. 6, 2013, 8 pages.
U.S. Appl. No. 13/038,191, Notice of Allowance dated Mar. 31, 2014, 7 pages.
Bryant, SYSTXBBUID01 Evolution Control Installation Instructions, Feb. 2004, 16 pages.
International Application No. PCT/US2011/061365, International Preliminary Report on Patentability dated May 30, 2013, 16 pages.

THERMOSTAT FACILITATING USER-FRIENDLY INSTALLATION THEREOF

CROSS-REFERENCE TO RELATED APPLICATIONS

This application is a continuation of U.S. patent application Ser. No. 14/292,642 filed May 30, 2014, which is a continuation of U.S. patent application Ser. No. 13/038,191 filed Mar. 1, 2011, now U.S. Pat. No. 8,757,507, which claims the benefit of U.S. Provisional No. 61/429,093 filed Dec. 31, 2010 and U.S. Provisional No. 61/415,771 filed Nov. 19, 2010, each of which is incorporated by reference herein. The subject matter of this patent specification relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 12/987,257 filed Jan. 10, 2011; U.S. Ser. No. 13/034,666 filed Feb. 24, 2011; U.S. Ser. No. 13/034,674 filed Feb. 24, 2011; and U.S. Ser. No. 13/034,678 filed Feb. 24, 2011. Each of the above-referenced patent applications is incorporated by reference herein. The above-referenced patent applications are collectively referenced hereinbelow as "the commonly assigned incorporated applications."

FIELD

This patent specification relates to the monitoring and control of heating, cooling, and air conditioning (HVAC) systems. More particularly, this patent specification relates to systems, methods, and related computer program products for facilitating a user-friendly thermostat installation process.

BACKGROUND AND SUMMARY

Substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

It would be beneficial, at both a societal level and on a per-home basis, for a large number of homes to have their existing older thermostats replaced by newer, microprocessor controlled "intelligent" thermostats having more advanced HVAC control capabilities that can save energy while also keeping the occupants comfortable. In furtherance of this goal, it would be desirable to provide a thermostat whose intelligence is directed not only toward energy savings and human comfort, but whose intelligence is also directed toward making its own installation process as simple and elegant as possible, such that the average do-it-yourselfer, handyman, or other person not having special HVAC system training could undertake the thermostat retrofit process.

In U.S. Ser. No. 05/065,813, which is incorporated by reference herein, an interactive electronic thermostat with installation assistance is discussed. As part of a user-interactive installation testing process discussed therein, the user is required to provide answers to questions presented to them by the system (such as the question, "What turned on?") about HVAC events that are currently happening. The thermostat discussed in U.S. Ser. No. 05/065,813 believed to bring about one or more disadvantages and/or to contain one or more shortcomings that are addressed and/or avoided by a thermostat provided according to one or more of the embodiments described hereinbelow. Other issues arise as would be apparent to one skilled in the art upon reading the present disclosure.

Provided according to one or more embodiments is a thermostat and related systems, methods, and computer program products for facilitating user-friendly installation thereof. Provided according to one embodiment is a thermostat for controlling the operation of an HVAC system having a plurality of wires requiring connection to the thermostat, each wire being associated with a distinct HVAC signal type. The thermostat comprises a control unit including at least one processor and at least one environmental sensor, and further includes a plurality of connection ports. Each connection port is associated with a predetermined HVAC signal type, and is configured to receive one of the plurality of wires. Associated with each connection port is a wire insertion sensing circuit that identifies to the control unit the presence or absence of an inserted wire therein. The thermostat further comprises a user interface operatively coupled to the control unit, the user interface including at least one output device for providing output information to a user and at least one input device for receiving one or more user inputs. The control unit is configured and programmed to cause the thermostat to carry out an installation verification process. In the installation verification process, the insertion sensing circuits are operated to identify a first subset of the connection ports into which wires have been inserted, the first subset of connection ports having an associated first subset of HVAC signal types. A first candidate HVAC operating function that is consistent with the first subset of HVAC signal types is identified. A first set of control signals is applied to the HVAC system through one or more of the first subset of connection ports, the first set of control signals being configured to instantiate operation of the HVAC system according to the first candidate HVAC operating function. Upon application of the first set of control signals, a first time sequence of environmental readings is acquired using the environmental sensor and processed to automatically determine, without requiring an input from the user, whether the HVAC system has successfully operated according to the first candidate HVAC operating function. An indication of an error condition is provided on the user display if the automatic determination is that the HVAC system has not successfully operated according to the first candidate operating function.

According to another embodiment, the installation verification process carried out by the thermostat further comprises receiving a first input from the user that is indicative of a completion of insertion of the required plurality of wires. Subsequent to receiving the first input, and before applying any set of operating control signals to the HVAC system including the first set of control signals, a second input is received from the user indicative of a user selection to begin normal operation of the HVAC system. Responsive to the received second input and before applying any set of operating control signals to the HVAC system including the first set of control signals, the identification of the first candidate HVAC operating function proceeds in a manner that is consistent with normal operation of the thermostat. More particularly, the first candidate HVAC operating function is assigned as a heating function or a cooling function, but only if the normal operation of the thermostat would call for such heating or cooling function (e.g., the heating function if the current temperature is less than or equal to a heating trip point temperature of the thermostat and the heating function is consistent with the first subset of HVAC signal types, and the cooling function if the current temperature is greater than or equal to a cooling trip point temperature of the thermostat and the cooling function is consistent with the first subset of HVAC signal types). Thus, the first candidate HVAC operating function is not identified, and no operating control signals are applied to the HVAC system, unless and until such operating function would be normally carried out at the currently sensed temperature.

According to another embodiment, an automated determination of a heat pump call convention is performed as part of the installation verification process for cases in which the insertion of an O/B wire was automatically detected as part of the automated wire insertion sensing process. If the first candidate HVAC operating function is a heating function, a first heat pump heating call is applied to the HVAC system according to a first heat pump call convention, and the room temperature is monitored to sense an associated temperature change. If an associated temperature rise is detected, then a conclusion is made that the heat pump heating functionality has been successfully carried out and the HVAC system has the first heat pump call convention. In contrast, if an associated temperature decrease is detected upon applying the first heat pump heating call, a second heat pump heating call is applied to the HVAC system according to a second heat pump call convention, and the room temperature is again monitored to sense an associated temperature change. If an associated temperature rise is detected, then a conclusion is made that the heat pump heating functionality has been successfully carried out and the HVAC system has the second heat pump call convention, whereas an indication of an error condition is provided on the user display if the associated temperature rise is not detected. If the first candidate HVAC operating function is a cooling function, a first heat pump cooling call is applied to the HVAC system according to the first (or second) heat pump call convention, and the room temperature is monitored to sense an associated temperature change. If an associated temperature decrease is detected, then a conclusion is made that the heat pump cooling functionality has been successfully carried out and the HVAC system has the first (or second) heat pump call convention. In contrast, if an associated temperature rise is detected upon applying the first heat pump cooling call, a second heat pump cooling call is applied to the HVAC system according to the second (or first) heat pump call convention, and the room temperature is again monitored to sense an associated temperature change. If an associated temperature decrease is detected, then a conclusion is made that the heat pump cooling functionality has been successfully carried out and the HVAC system has the second (or first) heat pump call convention, whereas an indication of an error condition is provided on the user display if the associated temperature decrease is not detected. For one embodiment, the first heat pump call convention comprises (i) for a heat pump heating call, energizing a cooling call (Y1) signal type while not energizing the heat pump (O/B) signal type, and (ii) for a heat pump cooling call, energizing Y1 while also energizing O/B, while the second heat pump call convention is a reverse of the first convention, i.e., energizing Y1 while also energizing O/B for a heat pump heating call, and energizing Y1 while not energizing O/B for a heat pump cooling call. Advantageously, the identification of the heat pump call convention is made automatically in the background, without requiring the user to manually adjust any wirings or settings, and without requiring the user to tell the thermostat what particular actions the HVAC system is taking or not taking.

DETAILED DESCRIPTION

It is to be appreciated that while one or more embodiments are described further herein in the context of typical residential home installations, such as single-family residential homes, and are particularly advantageous in the context of HVAC systems having relatively modest complexity, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings and industrial buildings. By relatively modest complexity, it is meant for some embodiments that the HVAC signal types involved in controlling the HVAC system of the enclosure are limited to the following HVAC signal types or subsets thereof: heating call (W1), cooling call (Y1), fan call (G), heat pump (O/B), common (C), auxiliary (AUX), heating call power (Rh), cooling call power (Rc), and, for some systems not having separate heating/cooling call power, a generic call power (R). It is to be appreciated that while the terms user, customer, installer, homeowner, occupant, guest, tenant, landlord, repair person, and the like may be used to refer to the person or persons who are interacting with the thermostat or other device or user interface in the context of one or more scenarios described herein, these references are by no means to be considered as limiting the scope of the present teachings with respect to the person or persons who are performing such actions.

Figure 1A:
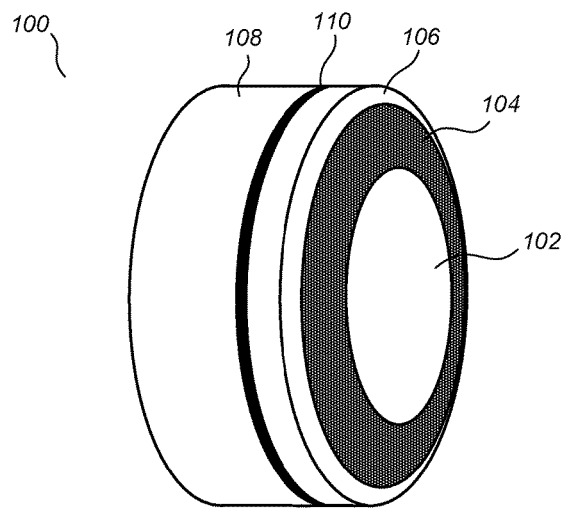
FIGS. 1A-1C illustrate external views of a thermostat according to an embodiment.
Figure 1B:
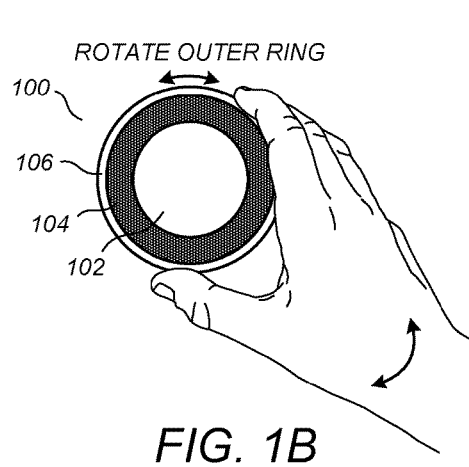
Figure 1C:
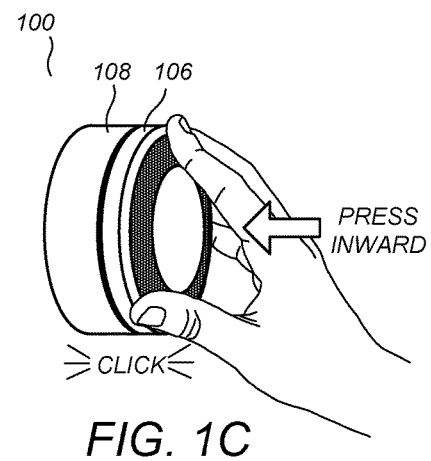

FIGS. 1A-1C illustrate external views of a thermostat 100 that may be configured and programmed to facilitate user-friendly installation thereof according to one or more embodiments. For some embodiments, the thermostat 100 corresponds to one or more of the intelligent, wirelessly communicating thermostatic units described in one or more of the commonly assigned incorporated applications, supra, such units being referenced alternatively as versatile sensing and control units, VSCUs, and/or sensing microsystems in some of the commonly assigned incorporated applications. As facilitated by its lightweight character, thermostat 100 preferably has a sleek, elegant appearance that does not detract from home decoration, and indeed can serve as a visually pleasing centerpiece for the immediate location in which it is installed. The thermostat 100 comprises a main body 108 that is preferably circular with a diameter of about 8 cm, and that has a visually pleasing outer finish, such as a satin nickel or chrome finish. Separated from the main body 108 by a small peripheral gap 110 is a cap-like structure comprising a rotatable outer ring 106, a sensor ring 104, and a circular display monitor 102. The outer ring 106 preferably has an outer finish identical to that of the main body 108, while the sensor ring 104 and circular display monitor 102 have a common circular glass (or plastic) outer covering that is gently arced in an outward direction and that provides a sleek yet solid and durable-looking overall appearance. The sensor ring 104 contains any of a wide variety of sensors including, without limitation, infrared sensors, visible-light sensors, and acoustic sensors. Preferably, the glass (or plastic) that covers the sensor ring 104 is smoked or mirrored such that the sensors themselves are not visible to the user. An air venting functionality is preferably provided, such as by virtue of the peripheral gap 110, which allows the ambient air to be sensed by an internal temperature sensor and any other internal sensors.

As discussed elsewhere in the commonly assigned incorporated applications, supra, for one embodiment the thermostat 100 is controlled by only two types of user input, the first being a rotation of the outer ring 106 (FIG. 1B), and the second being an inward push on the outer ring 106 (FIG. 1C) until an audible and/or tactile "click" occurs. By virtue of user rotation of the outer ring 106 and the inward pushing of the outer ring 106 responsive to intuitive and easy-to-read prompts on the circular display monitor 102, the thermostat 100 is advantageously capable of receiving all necessary information from the user for basic setup and operation.

Figure 2A:
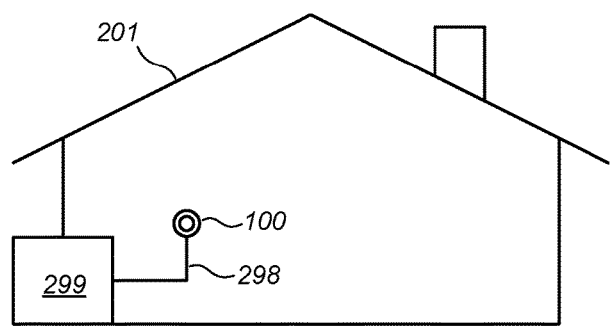
FIG. 2A illustrates a building enclosure including a thermostat and an HVAC system according to an embodiment.

FIG. 2A illustrates a thermostat 100 as installed in a house 201 having an HVAC system 299 and a set of control wires 298 extending therefrom. The thermostat 100 is connected to the HVAC system 299 by the control wires 298 for control thereof. As discussed elsewhere in the commonly assigned incorporated applications, supra, one or more additional, similar thermostat units (not shown) can be installed in the house 201, the multiple thermostat units communicating wirelessly with each other to optimize the control of the HVAC system 299 (and any additional HVAC systems in the house 201, each HVAC system being wired to a dedicated one of the thermostat units). An additional thermostat unit that is not wired to a respective HVAC system can be disposed in a cradle or a docking station, for example, and placed on a nightstand or in another strategic location in the house 201.

Figure 2B:
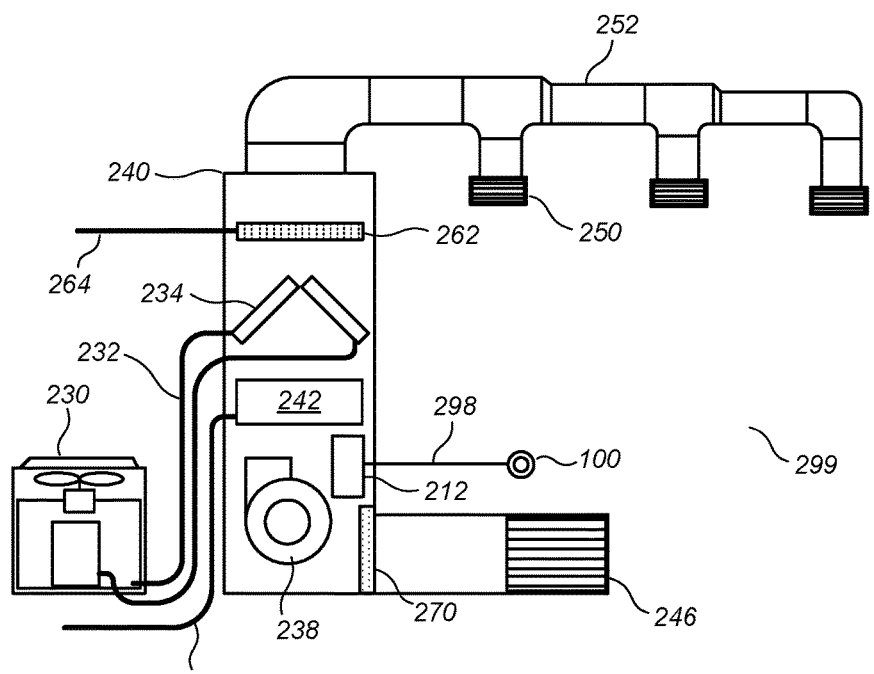
FIG. 2B illustrates a conceptual diagram of an HVAC system connected to a thermostat according to an embodiment.

FIG. 2B illustrates an exemplary diagram of the HVAC system 299 of FIG. 2A. HVAC system 299 provides heating, cooling, ventilation, and/or air handling for an enclosure, such as the single-family home 201 depicted in FIG. 2A. The HVAC system 299 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270 using fan 238 and is heated by the heating coils or elements 242. The heated air flows back into the enclosure at one or more locations through a supply air duct system 252 and supply air grills such as grill 250. In cooling, an outside compressor 230 passes a gas such as Freon through a set of heat exchanger coils to cool the gas. The gas then goes via line 232 to the cooling coils 234 in the air handlers 240 where it expands, cools and cools the air being circulated through the enclosure via fan 238. According to some embodiments a humidifier 262 is also provided which moistens the air using water provided by a water line 264. Although not shown in FIG. 2B, according to some embodiments the HVAC system for the enclosure has other known components such as dedicated outside vents to pass air to and from the outside, one or more dampers to control airflow within the duct systems, an emergency heating unit, and a dehumidifier. The HVAC system is selectively actuated via control electronics 212 that communicate with the thermostat 100 over control wires 298.

Figure 3:
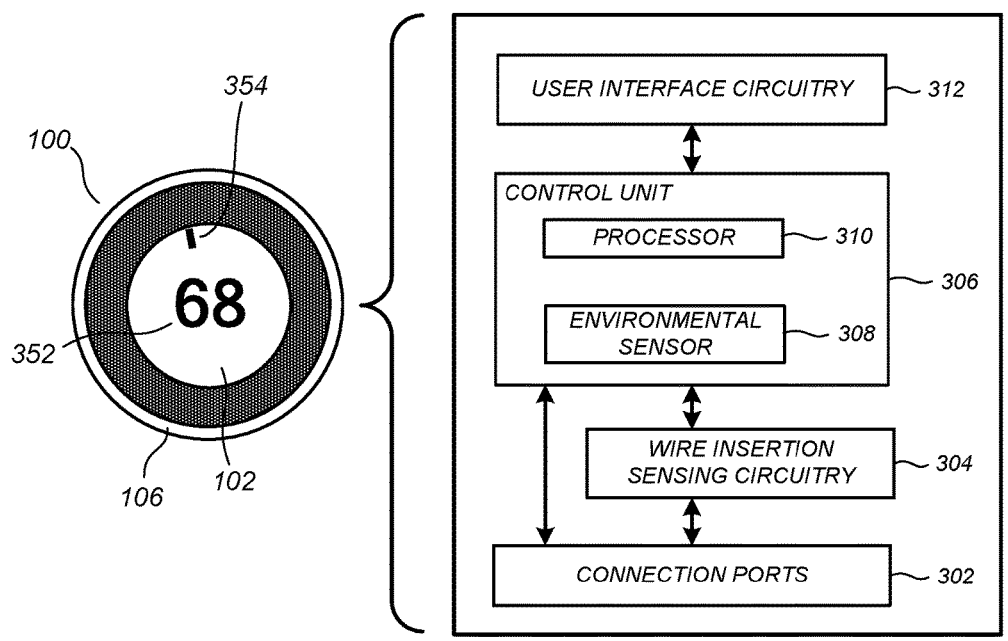
FIG. 3 illustrates a thermostat and a functional block diagram thereof according to an embodiment.

FIG. 3 illustrates a thermostat 100 and a conceptual functional block diagram thereof according to an embodiment. The thermostat 100 of FIG. 3 is illustrated at a point in time during an exemplary normal mode of operation, with the display monitor 102 displaying a current temperature 352 and a set point icon 354. Thermostat 100 comprises connection ports 302, wire insertion sensing circuitry 304, a control unit 306, and a user interface circuitry 312. The control unit 306 includes a processor 310 and at least one environmental sensor 308 such as, but not limited to, a temperature sensor. In addition to being coupled to the control unit 306 for control thereby and the display monitor 102, the user interface circuitry 312 is further coupled to the outer ring 106 for receiving user inputs of the type described with respect to FIGS. 1B-1C, supra.

The thermostat 100 comprises physical hardware and firmware configurations, along with hardware, firmware, and software programming that is capable of carrying out the currently described methods. In view of the instant disclosure, a person skilled in the art would be able to realize the physical hardware and firmware configurations and the hardware, firmware, and software programming that embody the physical and functional features described herein without undue experimentation using publicly available hardware and firmware components and known programming tools and development platforms.

Figure 4:
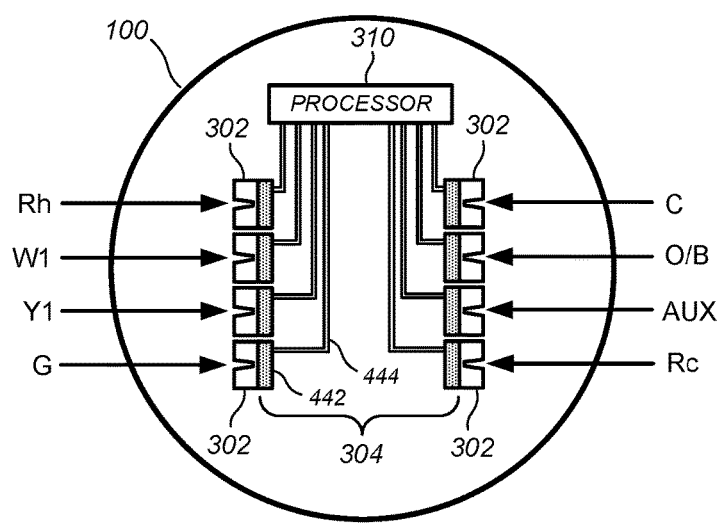
FIG. 4 illustrates connection ports and wire insertion sensing circuitry of a thermostat according to an embodiment.

FIG. 4 illustrates a conceptual diagram of the thermostat 100 with particular reference to the connection ports 302 and wire insertion sensing circuitry 304. It is to be appreciated that the connection ports 302 and wire insertion sensing circuitry 304 can, in whole or in part, be separably or inseparably integral with the main body of the thermostat 100 without departing from the scope of the present teachings. Thus, for example, for one embodiment the connection ports 302 and wire insertion sensing circuitry 304 can be inseparably integral with the main body of the thermostat 100, with the HVAC wires being inserted directly into the back before placement on the wall as a single monolithic unit. In another embodiment, the connection ports 302 and wire insertion sensing circuitry 304 can be located in a wall plate unit to which the main body of the thermostat attaches, it being understood that references herein to the insertion of wires into the thermostat encompass embodiments in which the wires are inserted into the wall plate and the main body is attached to the wall plate to form the completed thermostat 100.

As illustrated in FIG. 4, each connection port 302 is associated with a predetermined HVAC signal type. For one embodiment that has been found to provide an optimal balance between simplicity of installation for do-it-yourselfers and a reasonably broad retrofit applicability for a large number of homes, there are eight (8) connection ports 302 provided, which are dedicated respectively to a selected group of HVAC signal types consisting of heating call power (Rh), heating call (W1), cooling call (Y1), fan call (G), common (C), heat pump (O/B), auxiliary (AUX), and heating call power (Rh). Preferably, the thermostat 100 is of a "jumperless" type according to the commonly assigned U.S. Ser. No. 13/034,674, supra, such that (i) the Rh and Rc connection ports automatically remain shunted together for cases in which there is a single call power wire provided by the HVAC system, one or the other connection port receiving a single call power wire (which might be labeled R, V, Rh, or Rc depending on the particular HVAC installation), and (ii) the Rh and Rc connection ports are automatically electrically segregated for cases in which there are dual call power wires provided by the HVAC system that are inserted.

According to one embodiment, wire insertion sensing circuitry 304 includes, for each connection port 302, a port sensing circuit 442 that communicates with the processor 310 over a pair of electrical leads 444. Although the port sensing circuit 442 can operate in a variety of different ways without departing from the scope of the present teachings, in one embodiment the control port sensing circuit 442 comprises a two-position switch (not shown) coupled to the electrical leads 444, the two-position switch being closed to short the electrical leads 444 together when no wire has been inserted into the associated connection port 302, the two-position switch being mechanically urged into an open position to electrically segregate the electrical leads 444 when a wire is inserted into the associated connection port 302. The processor 310 thereby is able to readily sense when a wire is inserted into the connection port by virtue of the shorted or open state of the electrical leads 444. One particularly advantageous configuration that implements the combined functionality of the connection port 302 and the port sensing circuit 442 is described in the commonly assigned U.S. Ser. No. 13/034,666, supra.

Figure 5A:
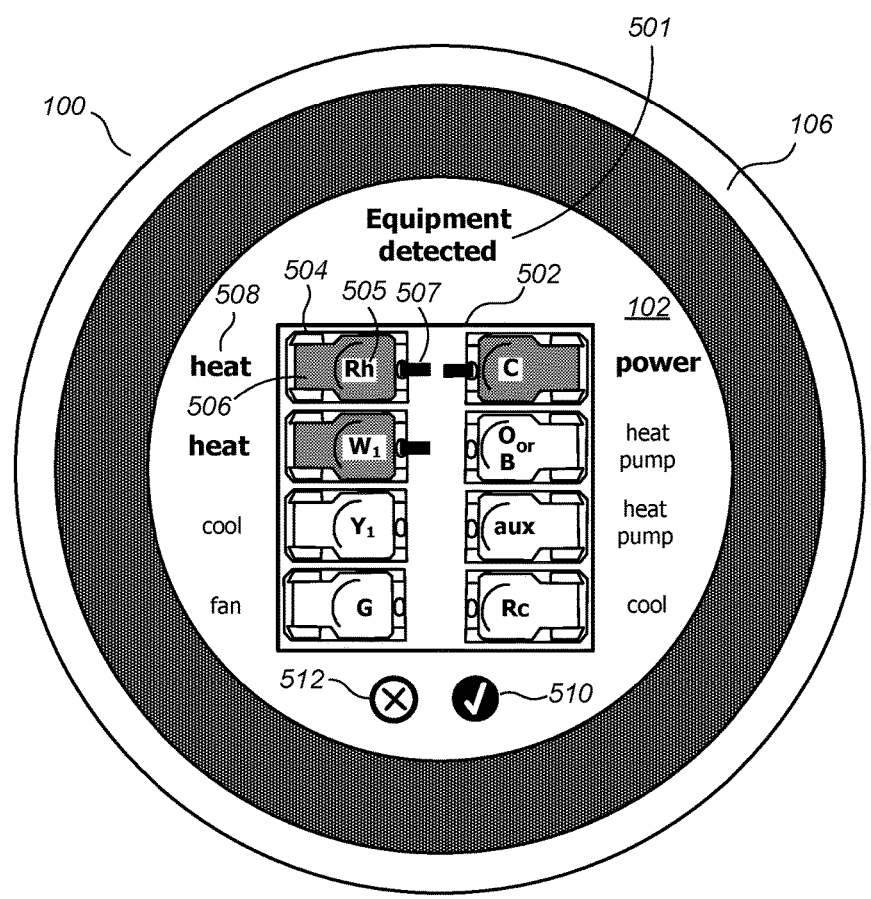
FIGS. 5A-5E illustrate user interfaces for displaying selected information and/or receiving selected user inputs according to one or more embodiments.

FIG. 5A illustrates a front view of the thermostat 100 at a point in time during or immediately after the user has inserted the HVAC wires and the unit has become electrically activated, the display monitor 102 displaying an "Equipment detected" screen 501 for quickly and intuitively communicating a status regarding the connection ports in which respective HVAC wires have been sensed. For one embodiment, the screen 501 becomes displayed as soon as any wire insertion has been sensed and there is sufficient electrical power available (from the onboard rechargeable battery, for instance, and/or a power stealing scheme when a 24 VAC powered wire has been inserted) for the thermostat 501 to perform the wire sensing and display functions. This can allow the user to view the screen 501 in real time as the wires are inserted. For another embodiment, which is more consistent with a two-part construction in which the wires are inserted into a wall plate and then the body of the thermostat is mounted on the wall plate, the screen 501 appears once that mounting is complete (which is necessarily subsequent to wire insertion) and power availability has been established.

Displayed on screen 501 is a photographic aerial view 502 of the connection ports 302 as they would actually appear to the user who is about to perform the wire insertion process. Although other graphical representations of the connection ports 302 are within the scope of the present teachings, the realism afforded by the photographic aerial view 502 is preferred in that there is one less mental step required in cognitively mapping between the physical world of the actual device and the conceptual world of the screen 501, thereby decreasing the likelihood of user mistakes or misinterpretations. The photographic aerial view 502 includes an aerial image 504 of each connection port including a symbol 505 thereon representative of its associated HVAC signal type. Next to each aerial image 504 is a simplified text description 508 of its associated HVAC signal type. For any particular connection port into which a wire insertion has been detected, the associated aerial image 504 is visually highlighted, such as by using superimposed visual shading 506, emboldening of the simplified test description 508, and superimposing a wire stub icon 507 thereon.

By looking at the screen 501, the user can quickly and accurately identify (i) the HVAC signal type identity of a first subset of the connection ports 302 into which wires have been inserted, as well as (ii) the HVAC signal type identity of a second subset of the connection ports 302 into which wires have not been inserted. For the example of FIG. 5A, it is readily apparent that inserted wires have been detected for the Rh, W1, and C connection ports, and that no wires have been inserted in the Y1, G, O/B, AUX, or Rc ports. Screen 501 further includes user input icons 510 (positive confirmation that the user agrees with the representation of which wires were inserted) and 512 (user disagrees with the representation), which can be selected using left-right rotation of the outer ring 106 (to toggle the highlighting of icons 510 and 512) and an inward clicking of the outer ring 106 (to affirmatively select the highlighted icon).

Figure 5B:
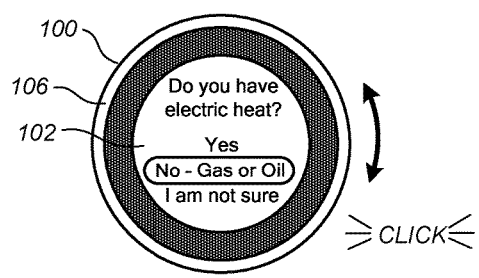

FIG. 5B illustrates a user interface screen for displaying a first inquiry and receiving a corresponding first inquiry response, the first inquiry relating to whether the HVAC system provides electric heat versus heat from gas or oil. According to one embodiment, the user interface screen of FIG. 5B is deployed subsequent to receiving a positive wire insertion confirmation at the screen of FIG. 5A, and prior to sending any operational control signals to the HVAC system, in the event that a heat call (W1) signal type is detected.

Figure 5C:
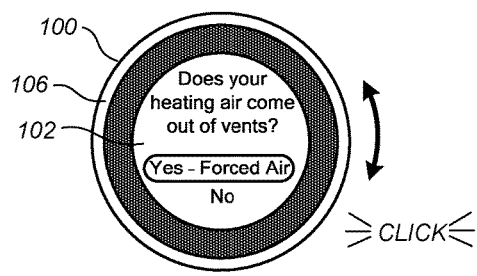

FIG. 5C illustrates a user interface screen for displaying a second inquiry and receiving a corresponding second inquiry response, the second inquiry relating to whether the HVAC system provides forced-air heat versus non-forced air (radiant) heat. According to one embodiment, the user interface screen of FIG. 5C is deployed subsequent to receiving a positive wire insertion confirmation at the screen of FIG. 5A, and prior to sending any operational control signals to the HVAC system, in the event that a combination of heat call (W1) and fan (G) signal types are detected. As indicated by the arrow and "click" notations on FIGS. 5B-5C, the user can provide a response using the left-right rotation of the outer ring 106 to toggle the highlighting among the multiple choices and an inward clicking of the outer ring 106 to affirmatively select the highlighted choice.

One of the features and advantages of one or more of the embodiments is that one or more potentially ambiguous scenarios (for example, the heat pump call signal convention as described further infra) are automatically resolved either by automated testing, by deduction based on the HVAC signal type identity of the inserted wires, and/or by a combination of automated testing and deduction. In this way, the user does not need to be bothered with details of resolving the ambiguity, thereby making the installation process more streamlined, enjoyable, and reliable. However, for the modest-complexity collection of HVAC signal types shown in the embodiment of FIG. 5A (Rh, W1, C, Y1, G, O/B, AUX, and Rc) it has been found prudent to deploy the user interface screen of FIG. 5B in the event the heat call (W1) signal type has been detected, and to further deploy the user interface screen of FIG. 5C in the event that both the heat call (W1) and fan (G) signal types have been detected.

For HVAC systems having a W1 signal type without a G signal type, it is possible that the HVAC system has a type of forced-air gas or oil furnace that controls its own fan actuation and therefore requires no thermostat-provided G signal type, while also being possible that the HVAC system has radiant heat (which requires no G signal type). On the other hand, for HVAC systems having a W1 signal type with a G signal type, it is possible that the HVAC system has a type of forced-air gas or oil furnace that relies on the G signal type to be provided from the thermostat, while also being possible that the HVAC system has radiant heat (with the G signal type being used for cooling system actuation only), while also being possible that the HVAC system is the particular type of forced-air gas or oil furnace that controls its own fan actuation (with the G signal type being used for cooling system actuation only). If an automated testing process for the heating functionality were used in which the G signal was withheld, and if that process were applied to an HVAC system having the type of forced-air gas or oil furnace that relies on the thermostat to provide the G signal type fan actuation, then that furnace could switch into a safety lock-out mode to prevent overheating. It has been found prudent to request the clarifying inputs from the user shown in FIGS. 5B-5C for the circumstances described in the preceding paragraph (i.e., FIG. 5B for W1, and adding FIG. 5C if G is also present with W1), notwithstanding an overall desired approach of keeping such inquiries to a minimum.

Figure 5D:
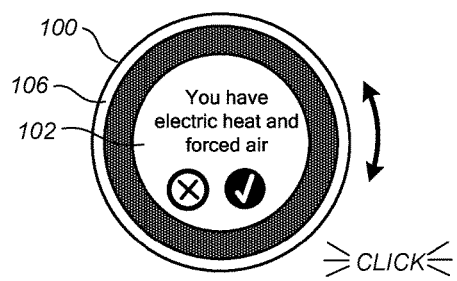

FIG. 5D illustrates an optional user interface screen for displaying a conclusion reached by the thermostat regarding one or more aspects of the HVAC system configuration according to an embodiment, and for receiving a user confirmation of that conclusion. The user interface screen of FIG. 5D may be invoked after the ambiguity resolving user inquiry screen(s) of FIG. 5B (and FIG. 5C if applicable), or after the wiring completion confirmation screen of FIG. 5A of no ambiguity was detected. The user interface screen of FIG. 5D can be useful in giving the user a chance to verify their previous actions and/or answers before continuing.

Figure 5E:
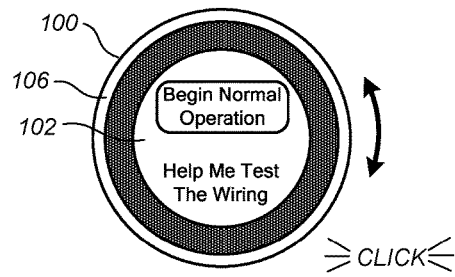

FIG. 5E illustrates an optional user interface screen for allowing the user to choose between beginning normal operation (the upper option in FIG. 5E) and launching a user-interactive wiring verification test (the lower option in FIG. 5E). For cases in which the user chooses the user-interactive wiring verification test, an interactive process analogous to that of U.S. Ser. No. 05/065,813, supra, is launched in which the thermostat 100 applies a time sequence of heating and cooling control signals (and, optionally, fan only control signals), and then asks the user to provide feedback information about what the HVAC system just did, for example, "Did the heat just turn on?", "Did the fan just turn on?", and so forth. According to an embodiment, the user is permitted to choose the option of beginning normal operation, and upon so choosing, all installation verification tests are automatically performed by the thermostat 100 in the background, that is, they are integrated into the normal operation of the thermostat 100. According to an alternative embodiment, the automated background-only installation verification process proceeds automatically after the wiring completion confirmation of FIG. 5A and the ambiguity-resolving user inputs of FIGS. 5B-5C (if needed), or after any conclusion confirming inputs of FIG. 5D that may optionally be used.

An automated background-only installation verification process according to an embodiment can substantially enhance the overall appeal of the thermostat 100 to users, while also providing competent functional verification of the installation for the large number of homes and other enclosures having HVAC systems of modest complexity. The automated background-only installation verification process is characterized in that, in addition to being automated (i.e., no sensory feedback is required from the user about what the HVAC system is doing), there is no artificial actuation of the HVAC system into a heating mode or cooling mode that is not actually required at the current temperature of the enclosure, but rather the thermostat 100 will wait until that function is actually needed according to the normal operation of the thermostat 100 before testing it. By normal operation, it is meant that the thermostat 100 is operating to control the enclosure temperature according to one or more predetermined comfort settings, invoking the cooling function when the sensed temperature is above a cooling trip point and invoking the heating function when the sensed temperature is below a heating trip point, wherein the heating and cooling trip points (or equivalent settings such as temperature set point and swing levels) are not artificially modified for sole purpose of invoking a particular heating or cooling call.

For cases in which the user has not yet interacted with the thermostat 100 to establish their comfort preferences (e.g., in a setup interview), the thermostat 100 can use some conventional default comfort settings to begin the normal operation, such as a heating trip point of 66 degrees and a cooling trip point of 80 degrees. Notably, it may not always be necessary to begin with conventional default comfort settings, since the user may have interacted with the thermostat 100 prior to wiring the thermostat to enter their various comfort preferences, and/or may have, in accordance with another embodiment currently disclosed and/or disclosed in one or more of the above-referenced commonly assigned applications, entered their preferences on a web site provided by the manufacturer who then programmed in those preferences before shipping the unit to the customer.

Figure 6:
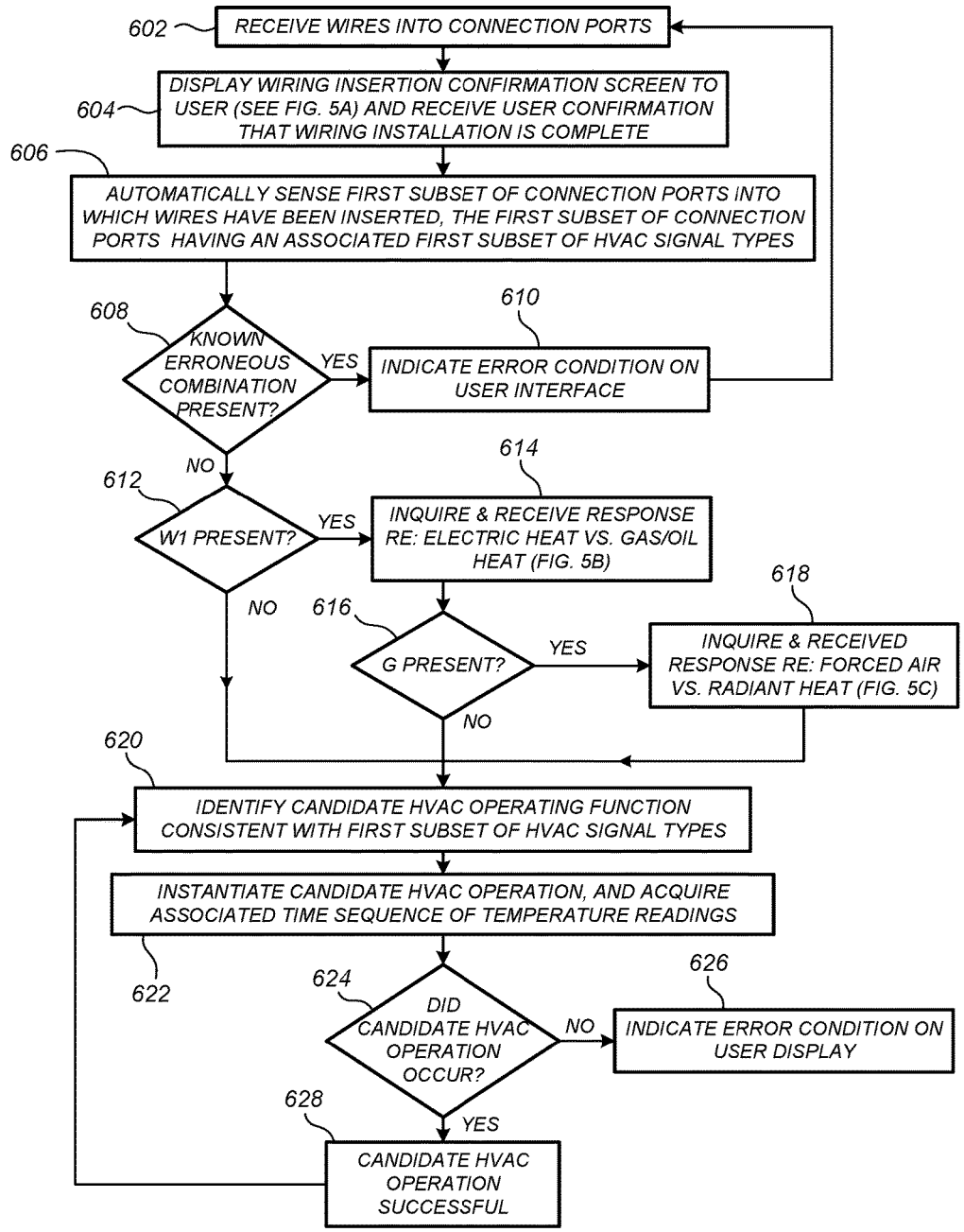
FIGS. 6-7 each illustrate facilitating user-friendly installation of a thermostat according to an embodiment.

FIG. 6 illustrates facilitating user-friendly installation of a thermostat according to an embodiment. At step 602, the HVAC wires are received into the connection ports 302. At step 604, the wiring confirmation screen of FIG. 5A is displayed to the user, and the user confirming that the wire insertion process is complete by agreeing with the displayed characterization. At step 606 the thermostat identifies, by automated wire insertion sensing, a first subset of the connection ports into which wires were inserted, the first subset of connection ports having an associated first subset of HVAC signal types. At step 608, the first subset of HVAC signal types is compared to information representative of known erroneous HVAC signal type combinations. Examples of known erroneous signal type combinations include: common (C) with no other signal types present; call power (Rh and/or Rc and/or "R") with no cooling call (Y1) and no heat call (W1) present; fan call (G) with no cooling call (Y1) and no heat call (W1) present; and heat pump (O/B) with no cooling call (Y1) present. If such known erroneous signal combination is indeed present, then at step 610 an error indication is provided, such as a message to re-check the wiring and/or to visit a help page at the web site of the thermostat manufacturer to help resolve the issue.

If no known erroneous signal combination is present at step 608, then the method proceeds with determining whether there are any known ambiguous HVAC signal type combinations presented by comparing the first subset of HVAC signal types to information representative of known ambiguous HVAC signal type combinations. For reasons relating to the above description for FIGS. 5B-5C, one particular known ambiguous combination is the presence of a heat call (W1), either by itself or with one or more other signal types present. If the heat call (W1) HVAC signal type has been sensed (step 612), then at step 614 the user inquiry and response screen of FIG. 5B is deployed, for receiving a clarification whether the HVAC system provides electric heat versus gas/oil heat. Also, if the fan call (G) signal type is present along with heat call (W1) (step 616), then at step 618 the user inquiry and response screen of FIG. 5C is deployed, for receiving a clarification whether the HVAC system provides forced-air heat versus radiant heat.

At step 620, a first candidate HVAC operating function that is consistent with the first subset of HVAC signal types is identified. According to one embodiment in which the automated installation verification is also a background-only process, the first candidate HVAC operating function is selected as a heating function if the current temperature is less than or equal to a normal operating heating trip point temperature of the thermostat and the heating function is consistent with the first subset of HVAC signal types, and is selected as a cooling function if the current temperature is greater than or equal to a normal operating cooling trip point temperature of the thermostat and the cooling function is consistent with the first subset of HVAC signal types, and if the temperature is such that neither of these criteria are met right away, the process halts until the temperature actually changes (and/or the normal comfort settings are changed) to a point where the normal heating or cooling triggers would be sent to the HVAC system. Thus, no operating control signals are sent to the to the HVAC system to activate heating or cooling unless and until such heating or cooling operation would be normally carried out at the currently sensed temperature according to the normal operation of the HVAC system.

It is to be appreciated that while background-only automated installation verification represents one particularly useful embodiment, the scope of the present teachings is not so limited. Thus, for example, in another embodiment a capability is provided in which the user can affirmatively request that the automated installation verification be carried out immediately. For such embodiment, the user would able to enjoy the benefit of not being required to stand by and tell the thermostat what the HVAC system is doing. This may be particularly convenient if the user plans on stepping out for a while. Notably, however, if the user is planning on staying inside during the automated testing, they should be prepared for the possibility that the HVAC system may drive the enclosure toward artificially uncomfortable temperatures for a period of time (e.g., the heating operation may be invoked on hot day to make an already-warm room hotter, or the cooling operation may be invoked on cold day to make an already-cool room colder).

At step 622, a first set of control signals is applied to the HVAC system through one or more of the first subset of connection ports, the first set of control signals being configured to instantiate operation of the HVAC system according to the first candidate HVAC operating function. Also at step 622, upon the application of the first set of control signals, a first time sequence of temperature readings is acquired and processed to automatically determine, without requiring an input from a user, whether the HVAC system has successfully operated according to the first candidate HVAC operating function.

At step 622, if the candidate HVAC operating function is forced air heating using an electric furnace, the first set of control signals includes energizing W1 and G together, if G is present, and the time period needed for affirming that the enclosure is successfully heating up at step 624 will typically be between 5-10 minutes and usually not more than 15 minutes. For forced air heating using a gas or oil furnace, the first set of control signals includes energizing W1 and energizing G if G is present and required, and the time period to affirm success at step 624 is also about 5-10 minutes and usually not more than 15 minutes. For radiant heating, the first set of control signals includes energizing W1 alone in all cases, and the time period needed at step 624 for affirming that the enclosure is successfully heating up will typically be between 30-60 minutes and usually not more than 90 minutes. For cooling without a heat pump, the first set of control signals includes energizing W1 and G together, if G is present, and the time period needed at step 624 for affirming that the enclosure is successfully cooling down will typically be about 20 minutes. For heating or cooling using a heat pump, the steps 622-628 are carried out according to a process that is more specifically set forth in FIG. 7, infra.

If it is determined at step 624 that the candidate HVAC operation did not occur, then at step 626 an error condition is indicated on the user interface. If it is determined at step 624 that the candidate HVAC operation did indeed occur, then at step 628 it is determined that the wiring and actuation associated with that candidate HVAC operation, as well as the underlying capability of the HVAC system itself, are all confirmed. The method then proceeds with identifying the next candidate HVAC function at step 620, which will generally be the opposing function (cooling or heating, respectively) to the function that was just verified (heating or cooling, respectively). Notably, for embodiments in which the automated installation verification is also a background-only process, the next candidate HVAC operation might not actually be verified for days, weeks, or even months depending on the time of year that the thermostat 100 is installed. For example, if thermostat 100 is installed in the midwestern United States in December, the heating functionality may be verified right away, while it may not be until May or June until the temperature gets warm enough that the cooling functionality is automatically tested. In view of the relatively large number of cases that are expected to turn out successfully for modest-complexity HVAC system, it is believed that both the small-scale and large-scale energy-saving benefits promoted by the elegance, simplicity, and user-friendliness afforded by the background-only installation verification process (i.e., faster adoption of the thermostat 100 by a larger number of customers) will outweigh the disadvantages of any delayed installation problem discovery that may take place.

Figure 7:
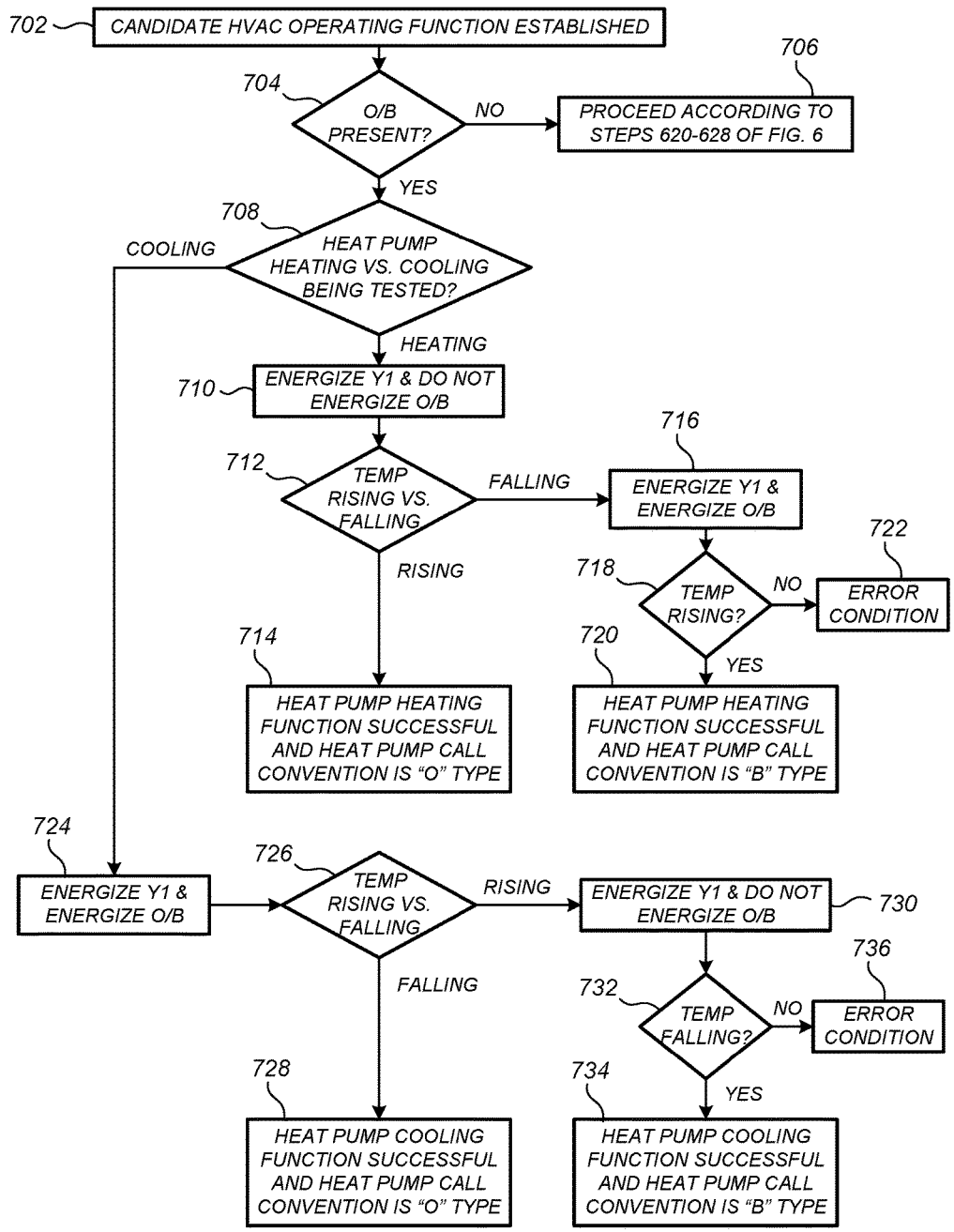

FIG. 7 facilitating user-friendly installation of a thermostat according to an embodiment. More particularly, FIG. 7 illustrates one particularly advantageous method for carrying out steps 622-628 of FIG. 6, supra, for the case in which a heat pump (O/B) HVAC signal type is found to be present in the first subset of HVAC signal types. According to an embodiment, an automated determination of a heat pump call convention is provided as part of the installation verification process. Once the first candidate operating function has been determined (step 702) and it is established at step 704 that the O/B signal is present, the method of steps 708-734 is carried out. If the first candidate HVAC operating function is a heating function (step 708), a first heat pump heating call is applied to the HVAC system according to a first heat pump call convention (step 710), and the room temperature is monitored to sense an associated temperature change (step 712). Preferably, the first heat pump call convention is selected as the so-called "O" convention that has been found to be present in a large majority of heat pump installations, such that the first guess that is about to be empirically verified will be correct for most cases. For an "O" convention heat pump heating call, the cooling call (Y1) signal type is energized while the heat pump (O/B) signal type is not energized, while for an opposing "B" convention heat pump heating call the Y1 signal type is energized while the heat pump (O/B) signal type is also energized.

A monitoring period of about 10-20 is usually sufficient for a determination to be made regarding whether the temperature of the enclosure is rising or falling (step 712). If the enclosure temperature is indeed found to be rising, then a conclusion is made that the heat pump heating functionality has been successfully carried out and the HVAC system has the first "O" heat pump call convention (step 714). In contrast, if an associated temperature decrease is detected, then at step 716 a second heat pump heating call is applied to the HVAC system according to the "B" heat pump call convention, and the room temperature is again monitored (step 718) to sense an associated temperature change. If an associated temperature rise is detected, then a conclusion is made that the heat pump heating functionality has been successfully carried out and the HVAC system has the second "B" heat pump call convention (step 720), whereas an indication of an error condition is provided on the user display (step 722) if the associated temperature rise is not detected.

If the first candidate HVAC operating function is a cooling function, then at step 724 a first heat pump cooling call is applied to the HVAC system according to the "O" heat pump call convention, and the room temperature is monitored to sense an associated temperature change (step 726). For an "O" convention heat pump cooling call, the Y1 signal type is energized with the O/B signal type is also energized, while for an opposing "B" convention heat pump cooling call the Y1 signal type is energized while the heat pump (O/B) signal type is not energized. If an associated temperature decrease is detected, then a conclusion is made that the heat pump cooling functionality has been successfully carried out and the HVAC system has the "O" heat pump call convention (step 728). In contrast, if an associated temperature rise is detected upon applying the first heat pump cooling call, a second heat pump cooling call is applied to the HVAC system according to the "B" heat pump call convention (step 730), and the room temperature is again monitored to sense an associated temperature change (step 732). If an associated temperature decrease is detected, then a conclusion is made that the heat pump cooling functionality has been successfully carried out and the HVAC system has the "B" heat pump call convention (step 734), whereas an indication of an error condition is provided on the user display (step 736) if the associated temperature decrease is not detected. Advantageously, the identification of the heat pump call convention is made automatically in the background, without requiring the user to manually adjust any wirings or settings, and without requiring the user to tell the thermostat what particular actions the HVAC system is taking or not taking.

Whereas many alterations and modifications of the present invention will no doubt become apparent to a person of ordinary skill in the art after having read the foregoing description, it is to be understood that the particular embodiments shown and described by way of illustration are in no way intended to be considered limiting. By way of example, while one or more of the above-described embodiments includes an inquiry to the user regarding whether the HVAC system has forced-air heat versus non-forced air (radiant) heat, in alternative embodiments this determination can be made empirically based on an initial test run of the HVAC heating functionality. According to one alternative embodiment, a time series of temperature readings acquired after instantiation of the HVAC heating operation is numerically processed to make an automated determination, without requiring an input from the user, regarding whether the HVAC system has forced-air heat versus non-forced air (radiant) heat. Preferably, the determination is based on both (i) the overall time that was needed to reach a target temperature (forced-air can typically take 5-15 minutes for an initial heating of an enclosure whereas radiant heat can typically take 30-60 minutes), as well as (ii) the particular shape of a graphical plot of temperature versus time (the forced-air curve can often have a more linear character than the radiant heat curve). Any of a variety of classification methods or other automated decision-making algorithms can be used, including systems that can be "trained" using a population of temperature-versus-time plots for a large number of enclosure-heating scenarios taken over a large population of real-world HVAC systems for which each relevant truth (i.e., whether it is forced-air heat versus radiant heat) is known. Therefore, reference to the details of the embodiments are not intended to limit their scope.

What is claimed is:

1. A thermostat for controlling an operation of a heating, ventilation, and air conditioning (HVAC) system, the HVAC system having a plurality of HVAC wires for connection to the thermostat, each of the plurality of HVAC wires being associated with unique HVAC signal types, the thermostat comprising:
   a control unit comprising at least one processor;
   a plurality of connection ports, each of the plurality of connection ports being associated with a predetermined one of the unique HVAC signal types, each of the plurality of connection ports being configured to receive one of the plurality of HVAC wires, and each of the plurality of connection ports having an associated wire insertion sensing circuit that identifies to the control unit a presence or absence of an inserted wire therein; and
   a user interface operatively coupled to the control unit, the user interface comprising an electronic display;
   wherein the control unit is configured and programmed to:
      operate the wire insertion sensing circuits to identify a set of the plurality of connection ports into which corresponding ones of the plurality of HVAC wires have been inserted;
      cause the electronic display to display a photograph of the plurality of connection ports as they actually appear to a user; and
      cause the electronic display to visually highlight the set of the plurality of connection ports into which the corresponding ones of the plurality of HVAC wires have been inserted.

2. The thermostat of claim 1, wherein the photograph of the plurality of connection ports comprises a photographic aerial view of the plurality of connection ports.

3. The thermostat of claim 1, wherein the control unit is configured and programmed to:
   cause the electronic display to display a symbol next to each of the plurality of connection ports that identifies the associated predetermined one of the unique HVAC signal types.

4. The thermostat of claim 3, wherein the symbol next to each of the plurality of connection ports comprises a text description of the associated predetermined one of the unique HVAC signal types.

5. The thermostat of claim 3, wherein causing the electronic display to visually highlight the set of the plurality of connection ports into which the corresponding ones of the plurality of HVAC wires have been inserted comprises:
   causing the text description of the associated predetermined one of the unique HVAC signal types to appear bold for each of the set of the plurality of connection ports into which the corresponding ones of the plurality of HVAC wires have been inserted.

6. The thermostat of claim 1, wherein causing the electronic display to visually highlight the set of the plurality of connection ports into which the corresponding ones of the plurality of HVAC wires have been inserted comprises:
   causing the electronic display to superimpose visual shading onto each of the set of the plurality of connection ports into which the corresponding ones of the plurality of HVAC wires have been inserted.

7. The thermostat of claim 1, wherein causing the electronic display to visually highlight the set of the plurality of connection ports into which the corresponding ones of the plurality of HVAC wires have been inserted comprises:
   causing the electronic display to superimpose a wire stub icon onto each of the set of the plurality of connection ports into which the corresponding ones of the plurality of HVAC wires have been inserted.

8. The thermostat of claim 1, wherein the control unit is configured and programmed to:
   cause the user interface to receive an input from the user indicating whether the user agrees with the representation of which wires have been inserted.

9. The thermostat of claim 1, wherein the control unit causes the electronic display to display the photograph of the plurality of connection ports as they actually appear to the user in response to detecting an initial wire insertion after the thermostat receives sufficient power to operate the electronic display.

10. The thermostat of claim 9, wherein the electronic display is updated in real-time as the plurality of HVAC wires are inserted into the plurality of connection ports, such that the user can view the electronic display as the plurality of HVAC wires are inserted.

11. A method for controlling an operation of a heating, ventilation, and air conditioning (HVAC) system, the HVAC system having a plurality of HVAC wires for connection to a thermostat, each of the plurality of HVAC wires being associated with unique HVAC signal types, the method comprising:
   operating a thermostat to control the HVAC system, wherein the thermostat comprises:
      a control unit comprising at least one processor;
      a plurality of connection ports, each of the plurality of connection ports being associated with a predetermined one of the unique HVAC signal types, each of the plurality of connection ports being configured to receive one of the plurality of HVAC wires, and each of the plurality of connection ports having an associated wire insertion sensing circuit that identifies to the control unit a presence or absence of an inserted wire therein; and
      a user interface operatively coupled to the control unit, the user interface comprising an electronic display;
   detecting, by the wire insertion sensing circuit, a set of the plurality of connection ports into which corresponding ones of the plurality of HVAC wires have been inserted;
   causing, by the control unit, the electronic display to display a photograph of the plurality of connection ports as they actually appear to a user; and
   causing, by the control unit, the electronic display to visually highlight the set of the plurality of connection ports into which the corresponding ones of the plurality of HVAC wires have been inserted.

12. The method of claim 11, wherein the photograph of the plurality of connection ports comprises a photographic aerial view of the plurality of connection ports.

13. The method of claim 11, further comprising:
   causing, by the control unit, the electronic display to display a symbol next to each of the plurality of connection ports that identifies the associated predetermined one of the unique HVAC signal types.

14. The method of claim 13, wherein the symbol next to each of the plurality of connection ports comprises a text description of the associated predetermined one of the unique HVAC signal types.

15. The method of claim 13, wherein causing the electronic display to visually highlight the set of the plurality of connection ports into which the corresponding ones of the plurality of HVAC wires have been inserted comprises:
   causing the text description of the associated predetermined one of the unique HVAC signal types to appear bold for each of the set of the plurality of connection ports into which the corresponding ones of the plurality of HVAC wires have been inserted.

16. The method of claim 11, wherein causing the electronic display to visually highlight the set of the plurality of connection ports into which the corresponding ones of the plurality of HVAC wires have been inserted comprises:
   causing the electronic display to superimpose visual shading onto each of the set of the plurality of connection ports into which the corresponding ones of the plurality of HVAC wires have been inserted.

17. The method of claim 11, wherein causing the electronic display to visually highlight the set of the plurality of connection ports into which the corresponding ones of the plurality of HVAC wires have been inserted comprises:
   causing the electronic display to superimpose a wire stub icon onto each of the set of the plurality of connection ports into which the corresponding ones of the plurality of HVAC wires have been inserted.

18. The method of claim 11, further comprising:
   causing, by the control unit, the user interface to receive an input from the user indicating whether the user agrees with the representation of which wires have been inserted.

19. The method of claim 11, wherein the control unit causes the electronic display to display the photograph of the plurality of connection ports as they actually appear to the user in response to detecting an initial wire insertion after the thermostat receives sufficient power to operate the electronic display.

20. The method of claim 19, wherein the electronic display is updated in real-time as the plurality of HVAC wires are inserted into the plurality of connection ports, such that the user can view the electronic display as the plurality of HVAC wires are inserted.

* * * * *